US007079879B1

(12) United States Patent
Sylvester et al.

(10) Patent No.: US 7,079,879 B1
(45) Date of Patent: Jul. 18, 2006

(54) PROTECTIVE COVER FOR CELLULAR TELEPHONE OR THE LIKE

(75) Inventors: Jeffery A. Sylvester, Dallas, GA (US); Mitchell E. Davis, Palmetto, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 643 days.

(21) Appl. No.: 09/965,910

(22) Filed: Sep. 28, 2001

(51) Int. Cl.
*H04Q 7/20* (2006.01)

(52) U.S. Cl. ............................... 455/575.8; 455/575.1; 455/90.3

(58) Field of Classification Search ............. 455/550.1, 455/566, 575.1, 575.3, 575.6, 575.8, 90.1, 455/90.3; 379/433.04, 437, 446, 451, 457; 224/148.6, 648, 651, 655; 206/96, 701
See application file for complete search history.

(56) References Cited

U.S. PATENT DOCUMENTS

| 4,573,573 | A | * | 3/1986 | Favaro ........................ 206/305 |
| 5,251,329 | A | * | 10/1993 | Takagi et al. ................ 455/572 |
| 5,535,928 | A | * | 7/1996 | Herring ....................... 224/250 |
| 5,703,945 | A | * | 12/1997 | Smith .......................... 379/446 |
| 5,711,469 | A | * | 1/1998 | Gormley et al. ............. 224/675 |
| 5,816,459 | A | * | 10/1998 | Armistead .................... 224/246 |
| 6,330,430 | B1 | * | 12/2001 | Jensfelt ..................... 455/575.8 |
| 6,701,159 | B1 | * | 3/2004 | Powell ......................... 379/446 |
| 2002/0066711 | A1 | * | 7/2002 | Flannery ...................... 455/566 |
| 2002/0086711 | A1 | * | 7/2002 | Flannery ...................... 455/566 |

FOREIGN PATENT DOCUMENTS

| JP | 07288567 A | * | 10/1995 |
| JP | 09121922 A | * | 5/1997 |
| JP | 2000115310 A | * | 4/2000 |

* cited by examiner

*Primary Examiner*—Jean A Gelin
(74) *Attorney, Agent, or Firm*—Withers & Keys, LLC

(57) ABSTRACT

A protective cover is provided for a telephone having a keypad and a display. The cover has a keypad portion for covering the keypad of the telephone to protect the telephone at the keypad, and a display portion for covering the display of the telephone to protect the telephone at the display.

3 Claims, 2 Drawing Sheets

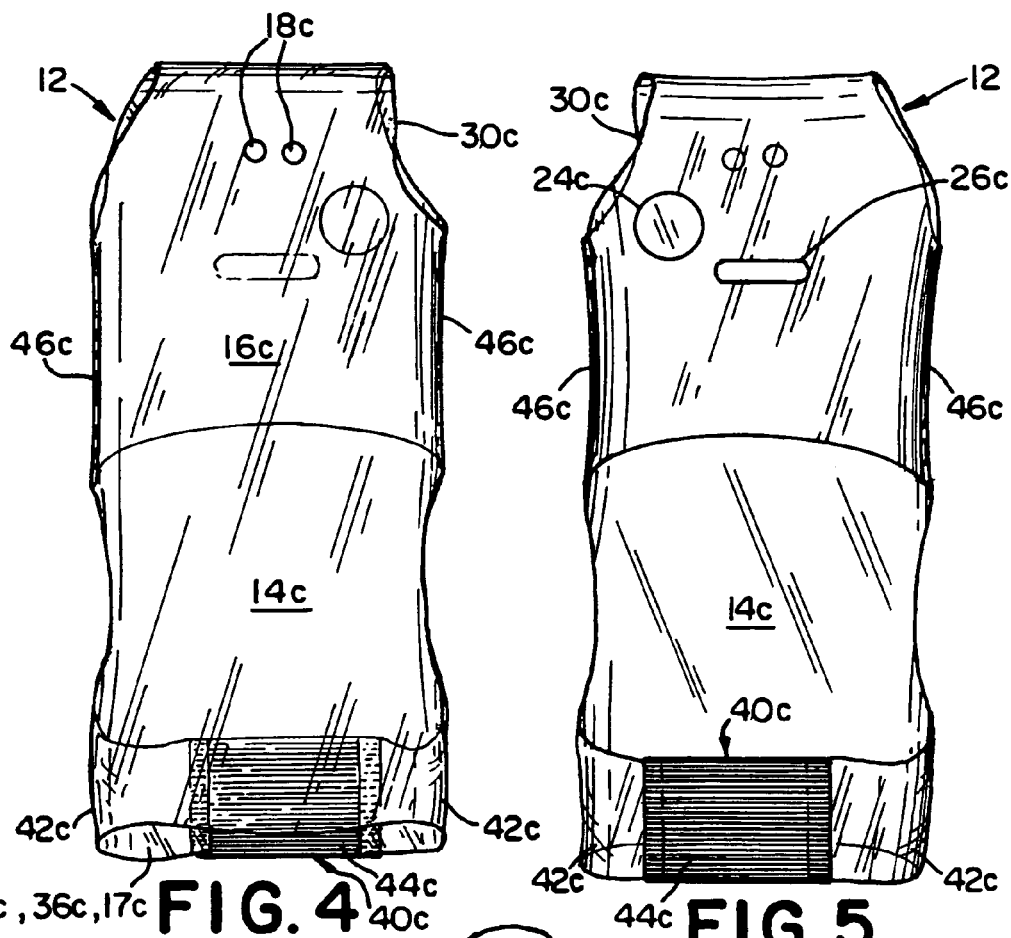
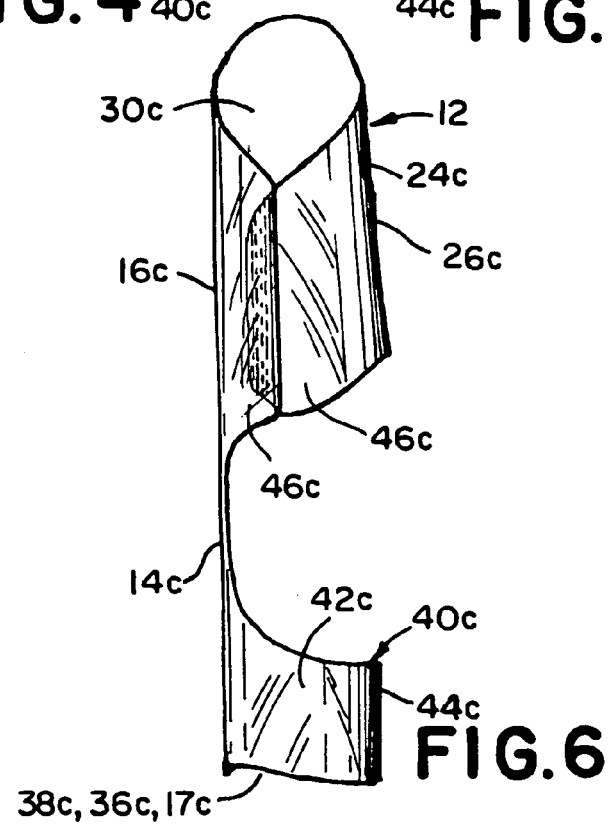

PROTECTIVE COVER FOR CELLULAR TELEPHONE OR THE LIKE

FIELD OF THE INVENTION

The present invention relates to a protective cover for covering a cellular telephone or the like. More particularly, the present invention relates to such a protective cover that allows the cellular telephone or the like to be used with the cover mounted thereto, and that allows the cellular telephone or the like to be mounted in a holding bracket or the like with the cover mounted thereto.

BACKGROUND OF THE INVENTION

Cellular telephones and the like are by now nearly ubiquitous. Moreover, such cellular telephones and the like are now routinely provided by employers to all types and manners of employees so that communication therebetween may be achieved nearly instantaneously and as is necessary and/or convenient.

An issue arises, however, in that at least some cellular telephones are exposed to harsh environments that are not conducive to the continued proper operation and expected life span of the telephones. For example, in the case of a service industry that regularly works outside, it can be expected that a service technician carrying a cellular telephone will expose such telephone to foul weather on occasion. In addition, such a service technician may regularly expose the telephone to dirt and grime or may expose his or her hands to dirt and grime and then transfer such dirt and grime to the telephone by way of his or her hands.

As may be appreciated, in at least some cellular telephones, liquids, dirt, grime, and the like upon contact therewith can enter into the interior of the telephone and interfere with the functioning of such telephones. For example, a liquid entering into the telephone can short out the telephone and/or cause other problems, either intermittently or steadily. Notably, at least some cellular telephones include appropriate seals or the like to prevent liquids, dirt, grime, and the like from entering into the telephones. Nevertheless, the liquids, dirt, grime, and the like can also affect the exterior of the telephone, both aesthetically and functionally. For example, a piece of grime in the area of a push-button key of a keypad could cause the key to stick. Accordingly, a need exists for a protective cover for the telephone that protects the telephone from liquids, dirt, grime, and the like.

Conceivably, the entire cellular telephone may be sealed within a protective cover to protect the telephone from the aforementioned harsh environments. For example, the telephone could be hermetically enclosed within a plastic bag or the like. However, and importantly, it is necessary at times to have access to the telephone to attach a connection to charge a battery thereof, to place the telephone in an adapter or cradle, to attach an external antenna to the telephone, to replace a battery thereof, and the like. Accordingly, a need exists for a protective cover for the telephone that can be mounted to the telephone and disengaged therefrom multiple times as necessary and/or convenient and in a relatively simple manner.

Also conceivably, it may be desirable to leave the protective cover mounted to the cellular telephone, even in instances where the telephone is to be mounted to a holder or cradle and the cradle electrically connects to contacts on the exterior of the telephone. For example, a service technician may wish to mount the telephone to a hands-free cradle within a service vehicle or the like without removing the protective cover. Accordingly, a need exists for a protective cover for the telephone that provides access apertures corresponding to the contacts on the exterior of the telephone.

SUMMARY OF THE INVENTION

The present invention satisfies the aforementioned needs by setting forth a protective cover for a telephone having a keypad and a display. The cover has a keypad portion for covering the keypad of the telephone to protect the telephone at the keypad, and a display portion for covering the display of the telephone to protect the telephone at the display.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings:

FIGS. 4, 5, and 6 are respectively front, rear, and right side elevational views of the cover of FIG. 2 in particular.

DETAILED DESCRIPTION OF PREFERRED EMBODIMENTS

Figure 1:
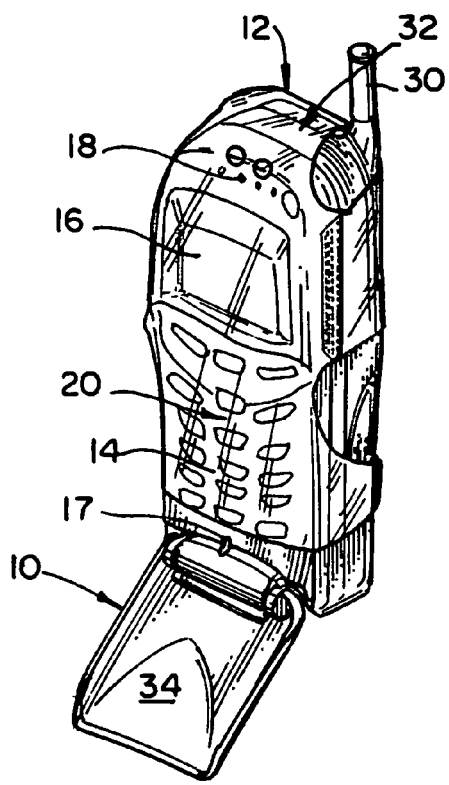
FIG. 1 is a front perspective view showing a cellular telephone or the like and a protective cover mounted thereto in accordance with one embodiment of the present invention.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Figure 2:
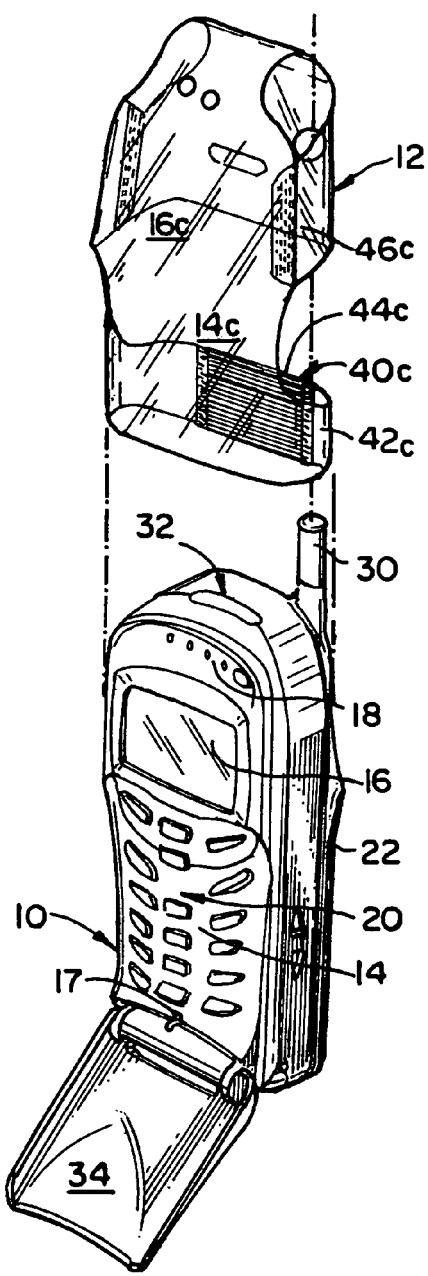
FIG. 2 is an exploded perspective view of the telephone and cover of FIG. 1.
Figure 3:
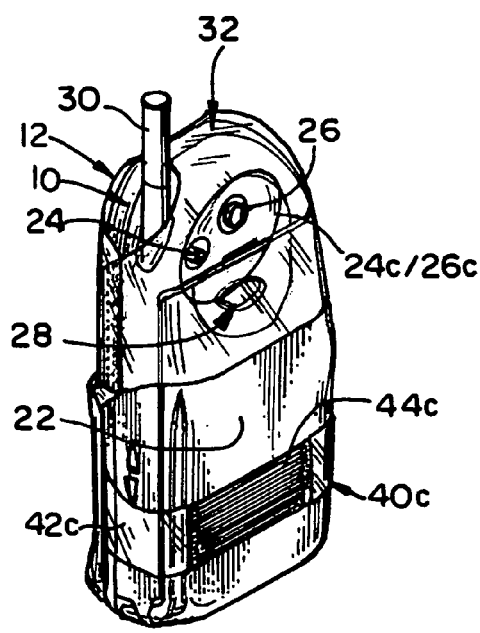
FIG. 3 is a rear perspective view of the telephone of FIG. 1 and an alternate embodiment of the cover of FIG. 2.

Referring to the drawings in detail, wherein like numerals are used to indicate like elements throughout, there is shown in FIGS. 1–3 a cellular telephone 10 having a protective cover 12 mounted thereto in accordance with one embodiment of the present invention. Note that although the present invention is described primarily in terms of a cover 12 for a cellular telephone 10, the cover 12 may also be employed on other telephone and non-telephone devices without departing from the spirit and scope of the present invention. For example, the cover 12 may alternately be for a cordless telephone, a pager, a handheld email device, etc.

As seen, the telephone 10 includes a keypad 14, display 16, sound pickup 17, and ear speaker 18 generally at a front face 20 thereof, a battery 22, external antenna connector 24, and holster knob 26 generally at a rear face 28 thereof, and an internal antenna nub 30 generally at a top face 32 thereof. The telephone 10 also typically includes a power and communications connector (not shown) generally at a bottom face thereof (not shown) generally opposite the top face 32 thereof. As also seen, the telephone 10 may have a flip cover 34 hingedly attached generally at the junction of the front face 20 and bottom face thereof that covers and swings out from at least a portion of the keypad 14.

As was discussed above, in at least some telephones 10, liquids, dirt, grime, and the like upon contact therewith can enter into the interior of the telephone and interfere with the functioning of such telephone 10. While at least some telephones 10 include appropriate seals or the like (not shown) to prevent liquids, dirt, grime, and the like from entering into the telephone 10, telephones 10 such as those with the flip cover 34 oftentimes omit the seal from the keypad 14. Thus, and as best seen in FIGS. 2 and 4–6, the protective cover 12 of the present invention includes a keypad portion 14c that covers the keypad 14 of the telephone 10 in an effort to protect the telephone 10 from the aforementioned liquids, dirt, grime, and the like that would otherwise enter into the telephone 10 through the keypad 14. Note that regardless of whether the keypad 14 is sealed, the keypad portion 14c also strives to protect the telephone 10 from the liquids, dirt, grime, and the like that would otherwise affect the exterior of the telephone 10, either aesthetically or functionally.

As may be appreciated, the telephone 10 is not especially susceptible to external penetration by liquids, dirt, grime, and the like in the region of the display 16. However, the display 16 is susceptible to being damaged and at any rate the aforementioned liquids, dirt, grime, and the like on the display are likely to interfere with viewing thereof. Accordingly, in one embodiment of the present invention, the cover 12 as formed also includes a display portion 16c that covers the display 16 of the telephone 10 in an effort to protect the display 16 from such external penetration and interfered viewing.

While the keypad 14 of the telephone 10 may at times not be sealed, it is likely that other potential areas of penetration are in fact sealed. Such sealed areas typically include the pickup 17, speaker 18, battery 22, external antenna connector 24, and holster knob 26, internal antenna nub 30, and power and communications connector (not shown). Moreover, the pickup 17 and speaker 18 should not be covered since to do so may interfere with sound collection and broadcasting, respectively, the external antenna connector 24 and power and communications connector should not be covered since to do so may interfere with mounting the telephone to an adapter, charger, hands-free cradle, or the like (not shown), the holster knob 26 should not be covered since to do so may interfere with coupling the telephone 10 to a holster (not shown) by way of the knob 26, and the internal antenna nub 30 should not be covered since to do so may interfere with transceiving therethrough and/or raising and lowering an internal antenna from the nub 30, if so equipped.

Accordingly, in one embodiment of the present invention, and as seen in FIGS. 2 and 4–6, the cover 12 for the telephone 10 defines a pickup aperture 17c therein to externally expose the pickup 17, a speaker aperture 18c therein to externally expose the speaker 18, an external antenna connector aperture 24c to externally expose the external antenna connector 24 (if present), a power and communications connector aperture 36c to externally expose the power and communications connector (if present, not shown), a holster knob aperture 26c to externally expose the holster knob 26 (if present), and an internal antenna nub aperture 30c to externally expose the internal antenna nub 30 (if present). As should be appreciated, all such aperture items on the cover 12 externally expose the corresponding items on the telephone 10 when the cover 12 is mounted to the telephone 10. Accordingly, such corresponding items on the telephone 10 are externally accessible even when the cover 12 is mounted thereto.

Of course, one or more of the aforementioned aperture items may be absent from the cover 12 while still being within the spirit and scope of the present invention, regardless of whether the corresponding item is absent from the telephone 10. For example, a holster knob aperture 26c is not necessary in the cover 12 if the telephone 10 has no corresponding holster knob 26. Note though that such holster knob aperture 26c may nevertheless still be defined in the cover 12 both for simplicity of manufacture and in the event the knob 26 might later be added to the telephone 10.

Note too that in some instances multiple apertures defined in the cover 12 may be combined to form a single aperture. For example, and as seen in FIG. 3, the connector apertures 24c and the knob aperture 26c as best seen in FIG. 5 have been combined to form a single aperture 24c/26c.

Likewise, in some instances apertures are not specifically designed into the cover but result from functional requirements of the cover 12 or design choices made with respect to the cover. For example, the cover 12 may be slipped over the telephone at the top face 32 thereof, as best seen in FIG. 2. Accordingly, the cover 12 defines a bottom aperture 38c through which the telephone 12 enters the cover 12 when the cover is mounted thereto, and the bottom aperture 38c encompasses the communications connector aperture 36c that externally exposes the power and communications connector at the bottom face of the telephone. For another example, the cover 12 may not reach to the bottom face of the telephone 10 so as to not interfere with movement of the flip cover 34. Accordingly, the bottom aperture 38c may also encompass the pickup aperture 17c that externally exposes the pickup 17 adjacent the flip cover 34. For yet another example, the process of forming the cover as discussed below may result in apertures on either side of the display portion 16c, and one of the formed apertures may encompass the internal antenna nub aperture 30c that externally exposes the internal antenna nub 30 (if present).

It may be necessary at times to remove the cover 12 from the telephone 10. For example, detaching the battery 22 from the telephone 10 may necessitate such removal. For another example, the cover 12 may have to be removed for cleaning. Accordingly, and in one embodiment of the present invention, the cover 12 for the telephone 10 can be mounted to the telephone 10 and disengaged therefrom multiple times as necessary and/or convenient and in a relatively simple manner. In particular, in one embodiment of the present invention, the cover 12 includes a securing device 40c that secures the cover 12 to the telephone 10 in a repeatedly mountable and disengagable manner.

As best seen in FIGS. 3 and 5, in one embodiment the securing device 40c includes a pair of wings 42c that extend generally from either lateral side of the keypad portion 14c and along the sides of the mounted-to telephone 10, and a strap 44c that interconnects the distal ends of the wings at the rear face 28 of the mounted-to telephone 10. Thus, the securing device 40c including the wings 42c and the strap 44c resides generally adjacent the bottom aperture 38c and in fact defines the bottom aperture 38c in combination with the keypad portion 14c. Preferably, the securing device 42c maintains an interference fit with the telephone 10 when the cover is mounted thereto so as to secure the cover 12 to the mounted-to telephone 10. In order to achieve such interference fit, the strap 44c may be constructed from an elastic or another expandable material. Such elastic or other expandable material is also advisable in the event the bottom aperture 38c must be slightly enlarged to fit over the top face 32 of the telephone 10 when the telephone 12 enters the cover 12 during mounting of the cover 12 thereto.

Of course, the securing device 42c may take any other appropriate form without departing from the spirit and scope of the present invention. For example, the strap 44c may instead be a pair of straps (not shown) connected to one another by hook-and-loop fastener or the like.

In one embodiment of the present invention, the cover 12 is formed from a clear plastic or the like that is flexible and sturdy. Any appropriate such plastic may be employed without departing from the spirit and scope of the present invention. Note that the plastic may be colorless or may have a color that does not interfere with viewing of the telephone 10 and elements thereof.

As seen, the cover 12 and apertures thereof may be formed from a single piece of a sheet of the plastic by stamping, cutting, or other appropriate means. Any appropriate forming process may be employed without departing from the spirit and scope of the present invention. In the embodiments of the present invention shown in the drawings, the cover 12 as stamped or cut extends generally longitudinal when flat (not shown) and has a bottom zone including the keypad portion 14 and the wings 42c of the securing device 40c and defining one longitudinal end of the piece, a back zone defining the other longitudinal end of the piece, and a top zone between the top zone and back zone and including the display portion 16.

As best seen in FIG. 6, the piece includes two lateral extensions 46c on each lateral side thereof, with one pair of the extensions 46c on either lateral side of the top zone and the other pair of the extensions 46c on either lateral side of the back zone. Thus, the piece is folded in a generally curving manner along a generally transverse line between the top zone and back zone such that the respective lateral extensions 46c on each lateral side encounter one another. As may be appreciated, the area of the fold runs generally along the top face 32 of the telephone when the cover 12 is mounted thereto. Such encountering extensions 46c are then secured to one another and thus run generally along the sides of the telephone 10 when the cover 12 is mounted thereto. As seen, such secured extensions 46c and the area of the fold result in the apertures (including the aperture 30c) on either side of the display portion 16c as were discussed above. The wings 42c of the securing device 40c are also secured to the strap 44c. Such securing may be achieved by an epoxy or glue, a heat or sonic welding process, or the like.

In the foregoing description, it can be seen that the present invention comprises a new and useful protective cover 12 for a cellular telephone 10 or the like, where the cover 12 protects the telephone 10 from liquids, dirt, grime, and the like, can be mounted to the telephone 10 and disengaged therefrom multiple times as necessary and/or convenient and in a relatively simple manner, and provides access apertures corresponding to items on the exterior of the telephone 10. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A protective cover for a telephone having a keypad and a display, the cover comprising:
   a keypad portion for covering the keypad of the telephone to protect the telephone at the keypad; and
   a display portion for covering the display of the telephone to protect the telephone at the display,
   the cover formed from a single longitudinally extending piece of a sheet of plastic comprising a bottom zone including the keypad portion and defining one longitudinal end of the piece, a back zone defining the other longitudinal end of the piece, and a top zone between the bottom zone and back zone and including the display portion, and
   further comprising two lateral extensions on each lateral side of the piece, one pair of the extensions being on either lateral side of the top zone and the other pair of the extensions being on either lateral side of the back zone, the piece being folded along a generally transverse line between the top zone and back zone such that the respective lateral extensions on each lateral side encounter one another, the encountering extensions being secured to one another and thus running generally along sides of the telephone when the cover is mounted thereto.

2. The cover of claim 1 wherein the fold runs generally along a top face of the telephone when the cover is mounted thereto.

3. A protective cover for a telephone having a keypad and a display, the cover comprising:
   a keypad portion for covering the keypad of the telephone to protect the telephone at the keypad; and
   a display portion for covering the display of the telephone to protect the telephone at the display,
   the cover formed from a single longitudinally extending piece of a sheet of plastic comprising a bottom zone including the keypad portion and defining one longitudinal end of the piece, a back zone defining the other longitudinal end of the piece, and a top zone between the bottom zone and back zone and including the display portion,
   the cover further comprising two lateral extensions on each lateral side of the piece, one pair of the extensions being on either lateral side of the top zone and the other pair of the extensions being on either lateral side of the back zone, the piece being folded along a generally transverse line between the top zone and back zone such that the respective lateral extensions on each lateral side encounter one another, the encountering extensions being secured to one another and thus running generally along sides of the telephone when the cover is mounted thereto, the fold running generally along a top face of the telephone when the cover is mounted thereto,
   the cover further including a securing device for securing the cover to the telephone, the securing device including a pair of wings that extend generally from either lateral side of the keypad portion and along sides of the mounted-to telephone, and a strap that interconnects distal ends of the wings at a rear face of the mounted-to telephone, wherein the bottom zone includes the wings of the securing device.

* * * * *